United States Patent [19]

Mozdzen et al.

[11] Patent Number: 5,774,001
[45] Date of Patent: *Jun. 30, 1998

[54] METHOD FOR ELIMINATING MULTIPLE OUTPUT SWITCHING TIMING SKEWS IN A SOURCE SYNCHRONOUS DESIGN

[75] Inventors: Thomas J. Mozdzen, Gilbert, Ariz.; Harry Muljono, San Jose, Calif.

[73] Assignee: Intel Corporation, Santa Clara, Calif.

[ * ] Notice: The term of this patent shall not extend beyond the expiration date of Pat. No. 5,723,995.

[21] Appl. No.: 575,604
[22] Filed: Dec. 20, 1995
[51] Int. Cl.[6] ....................................... H03K 5/15
[52] U.S. Cl. ........................... 327/141; 327/258; 327/295
[58] Field of Search ................... 327/141, 144, 327/145–147, 150, 152, 153, 155, 156, 292–297, 299, 233–235, 238, 254, 255, 257, 258, 259

[56] References Cited

U.S. PATENT DOCUMENTS

| | | | |
|---|---|---|---|
| 4,482,826 | 11/1984 | Ems et al. | 327/270 |
| 4,816,700 | 3/1989 | Imel | 327/259 |
| 5,015,872 | 5/1991 | Rein | 327/234 |
| 5,345,109 | 9/1994 | Mehta | 327/259 |
| 5,486,783 | 1/1996 | Baumert et al. | 327/150 |
| 5,576,652 | 11/1996 | Boehlke | 327/254 |

*Primary Examiner*—Timothy P. Callahan
*Assistant Examiner*—T. T. Lam
*Attorney, Agent, or Firm*—Blakely, Sokoloff, Taylor & Zafman

[57] ABSTRACT

A source synchronous computer system to ensure the capturing of signals transmitted from a first component to a second component. An integrated circuit operating on a core clock signal and an I/O clock signal, the circuit comprising a plurality of data drivers and a plurality of delayed I/O clock generators, wherein the I/O clock generators generate delayed I/O clocks signals that follow the I/O clock signal by a phase multiple of the core clock signal. The integrated circuit outputs data through output nodes that are synchronized with I/O clock signal. By outputting data signals in the I/O clock domain and using the delayed I/O clock signals to synchronize transmission with external components, the integrated circuit ensures that the data signals are valid before the external component latches the data. A set of data signals and a delayed I/O clock are generated from similar drivers to further ensure that the data signal is valid before the external component latches the data.

10 Claims, 4 Drawing Sheets

METHOD FOR ELIMINATING MULTIPLE OUTPUT SWITCHING TIMING SKEWS IN A SOURCE SYNCHRONOUS DESIGN

FIELD OF THE INVENTION

The present invention generally relates to reducing the output to output timing skews in a source synchronous design and more particularly to reducing the timing skews created by the switching of multiple outputs.

BACKGROUND OF THE INVENTION

External clock chips are often used to synchronize the timing between communicating chipsets. The external clock chip generates a system clock that is routed throughout the circuit board to different components for translation into an internal clock. The internal clock is then used by the individual components to generate internal and external signals. The extended routing of the system clock combined with the translation of the system clock to an internal clock by individual components results in timing variations at the interface of the different components. For systems operating at a low frequency, most variations in timing interfaces are absorbed by the longer system clock cycle and any extreme timing variations are bypassed through the use of wait states added to the actual valid time of a signal. As microprocessor operating frequencies are improved, system clock speeds must increase to fully utilize the benefits of a faster microprocessor, thus reducing the period of the system clock cycle and requiring additional use of wait states. This approach of adding wait states for a faster system clock imposes a relative performance penalty, especially in view of the fact that the microprocessor while operating at a higher frequency can remain idle during these wait states.

Source synchronous designs have been utilized to reduce the variation in timing interface between components. Source synchronous designs require the sharing of an input/output (I/O) clock between components that communicate frequently, thus reducing timing variations and limiting the addition of wait states. One drawback of such designs, however is that various output switching conditions can cause the driven I/O clock to fluctuate resulting in timing skews and the incorrect capture of data by the receiving component.

FIG. 1 shows a prior art shared clock system. CLOCK CHIP 130 is an external clock chip circuit generating system clock signals CLOCKIN 1 and CLOCKIN 2 for use by different components. Although this illustration shows CLOCK CHIP 130 coupled between a microprocessor, CPU 160, and EXTERNAL CHIPSET 170; typical shared clock systems have CLOCK CHIP 130 coupled to a large number of components. CPU 160 comprises an input CLOCKIN 1 coupled to PLL 100 and a bi-directional bus, DATABUS 3, coupled to I/O LOGIC 120. The CLOCKIN 1 signal is an output of the external CLOCK CHIP 130 and is used by CPU 160 to generate the internal clock I/O CLOCK 1 through the use of phase lock loop (PLL) circuitry, PLL 100. PLL 100 also generates PROCESSOR CLOCK which is routed throughout CPU 160 for use by CORE LOGIC 110. PROCESSOR CLOCK generally operates at a higher frequency than I/O CLOCK 1 because CORE LOGIC 110 does not have to communicate directly with EXTERNAL CHIPSET 170. Instead, CORE LOGIC 110 communicates to EXTERNAL CHIPSET 170 through I/O LOGIC 120. Similarly, CPU 160 can use I/O LOGIC 120 to communicate with other external components. EXTERNAL CHIPSET 170 is typically an off chip component, such as a secondary level cache (L2 cache), that communicates with CPU 160 through the use of DATABUS 3. Communication along DATABUS 3 is synchronized through the use of internal clocks I/O CLOCK 2 and I/O CLOCK 1. I/O CLOCK 2 is generated by PLL 140 for use in I/O LOGIC 150's latching circuitry. The use of different clocks, I/O CLOCK 1 to output signals along DATABUS 3, via I/O LOGIC 120, and I/O CLOCK 2 to receive signals from DATABUS 3, via I/O LOGIC 150, leads to a timing variation between CPU 160 and EXTERNAL CHIPSET 170.

As the speed of next generation microprocessor designs improves, shared clock systems have great difficulty synchronizing the high speed data transmission rates required by these next generation designs. For example, the use of a shared clock system between a microprocessor operating at a frequency of 120 megahertz (MHz) and a system clock operating at a frequency of 60 MHz may lead to a two cycle processor delay during the subsequent transmission of data to an external component. To improve the 60 MHz operating frequency of the system clock, the timing variations created by the routing of external system clocks and the generation of multiple internal clocks would have to be reduced. Although efforts to reduce these timing variation has lead to innovative system designs, the typical system clock does not operate at a frequency comparable to the microprocessor.

To circumvent the timing variations associated with shared clock system designs a source synchronous design is utilized, wherein a microprocessor shares its internal input/output (I/O) clock signal, used to generate its data outputs, with another component. Because the sharing of an internal I/O clock among different components reduces this timing variation and increases the data transmission speed, it may be desirable to have a source synchronous clocking scheme wherein an input/output clock with a consistent delay is used by the receiving component to latch data from the driving component.

SUMMARY OF THE INVENTION

A processor is described for use in a source synchronous design which outputs I/O clock signals that are delayed by a multiple phase of the internal processor clock. The I/O clock signals are used by receiving components to synchronize the latching of the data outputted by the processor. The added delay ensures that the output data of the processor is valid before the receiving components latch the data.

In one embodiment, the I/O signals are generated by I/O clock generators which are coupled to a plurality of DATABUS drivers. A first I/O clock generator generates a first I/O clock signal. The first I/O clock signal is used by a receiver component to synchronize latches used to capture the first set of outputs from the first set of databus drivers. The I/O generator generally comprises a latch, combinational logic, and final stage drivers similar to the databus drivers. The I/O generator's latch is coupled between the internal processor clock generated by the PLL, the I/O clock generated by the PLL, and the final stage drivers. Dispersing the I/O clock generators among a group of databus drivers, adding a phase delay that is a derivative of the processor clock to the generation of the I/O clock signal, and using a similar driver for the I/O clock signal as the databus drivers ensures that the I/O clock signal does not arrive at the receiving component before the outputted data.

BRIEF DESCRIPTION OF THE DRAWINGS

The present invention is illustrated by way of example and not limitation in the figures of the accompanying drawing, in which like references indicate similar elements, and in which.

DETAILED DESCRIPTION

A clocking scheme is described which uses a CMOS circuit to generate a clocking signal that is delayed by a phase multiple of the processor clock. As shown by the timing diagram of FIG. 4, data transmitted along a bus has a finite period during which the data's value is indeterminable, specifically the shaded region found between point H and point I and the shaded region found between point J and point K. The CMOS circuit ensures that a receiving component does not latch the data during these periods. Using a phase multiple of an internal clock, PROCESSOR CLOCK, the CMOS circuit delays the latching clock used by the receiving components to point E or point G in the timing diagram. Thus, ensuring that the data presented on the bus has stabilized before the data is latched by the receiving component. As shown in the timing diagram use of a non-delayed clocking signal, I/O CLOCK, leads to latching by the receiving components at point D and point F, periods in which the data is possibly invalid. Although, delay to the clocking signal can be added through the use of delay elements, for example an inverter chain, such designs lead to a variable delay. Using the processor clock to delay the external clocking signal leads to a constant delay that is easily quantified and controlled through the phase lock loop circuitry (PLL).

Figure 1:
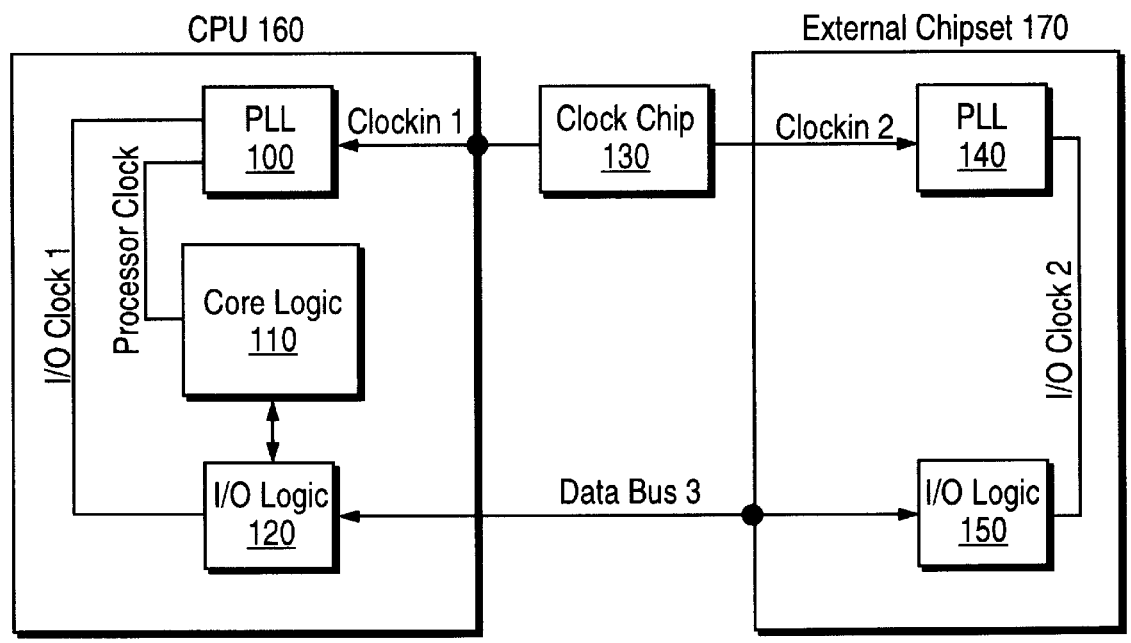
FIG. 1 is an illustration of a prior art implementation of a shared clock system.
Figure 2:
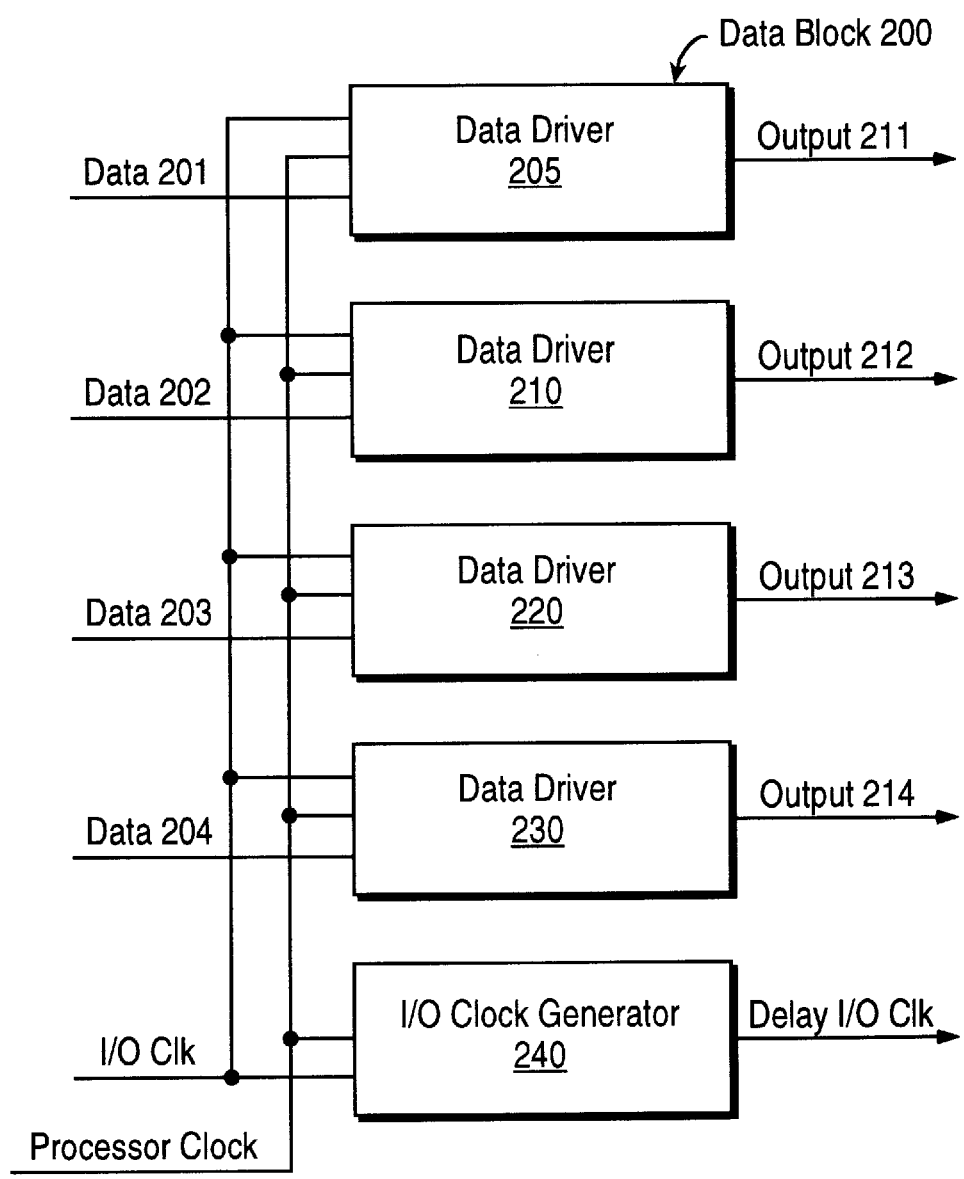
FIG. 2 is an illustration of one embodiment of the present invention wherein a group of data drivers are coupled to an I/O clock generator.
Figure 3:
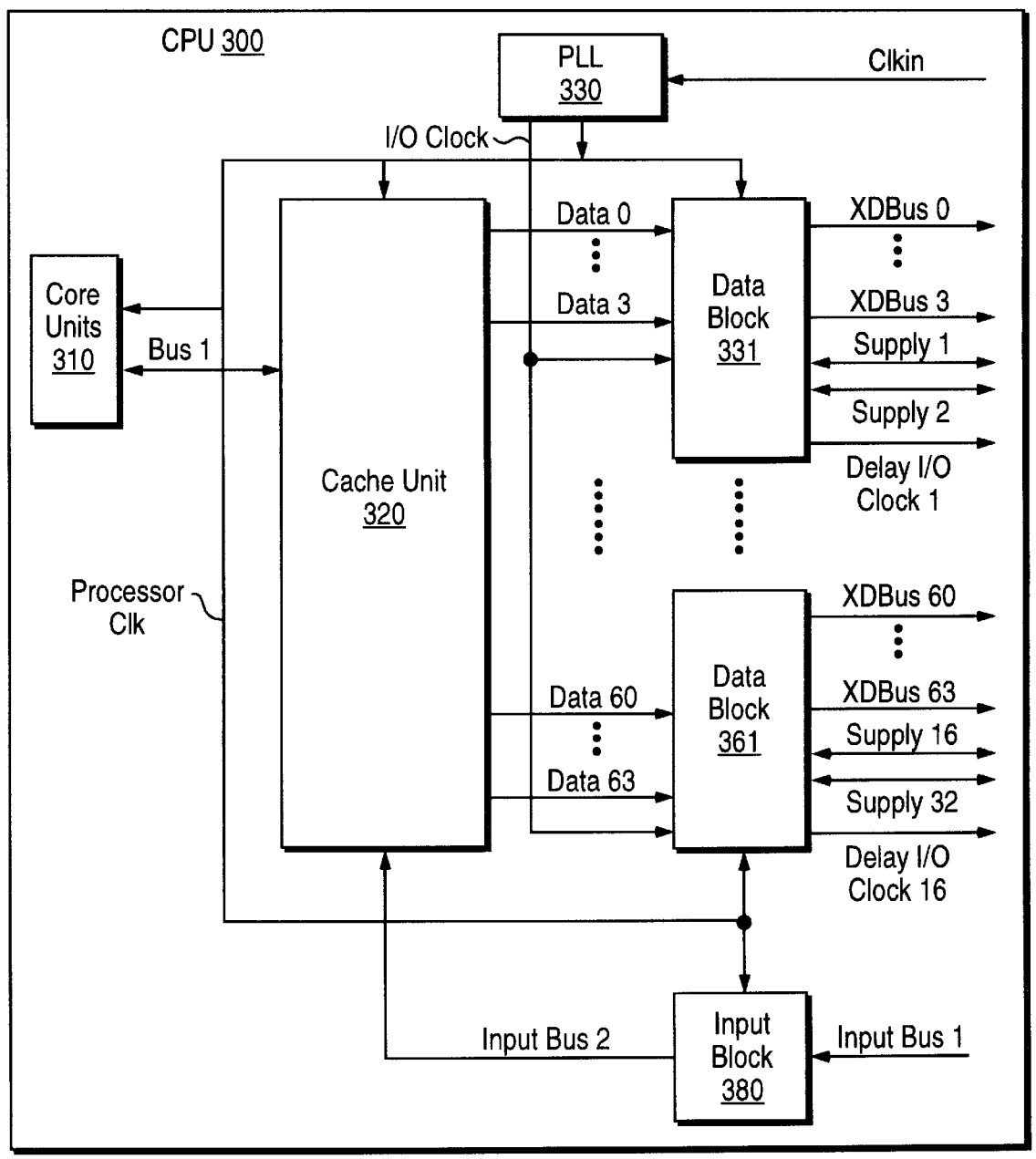
FIG. 3 is an illustration of another embodiment of the present invention wherein a CPU, for use in a source synchronous design utilizing the circuit of FIG. 2, generates output signals and delayed I/O clock signals.

While diagrams representing certain embodiments of the present invention are illustrated in FIGS. 2 and 3, these illustrations are not intended to limit the invention. The specific circuits described herein are only meant to help clarify one's understanding of the present invention and to illustrate particular embodiments in which the present invention may be implemented. It will be appreciated that the broader spirit and scope of the present invention, as set forth in the appended claims, may be applied to any type of circuit which seeks the performance achievements attained by the present invention.

FIG. 2 shows DATA BLOCK 200 according to one embodiment. DATA DRIVERs 205, 210, 220, and 230 are used by DATA BLOCK 200 to generate OUTPUTS 211, 212, 213, and 214. The DATA DRIVERs 205, 210, 220, and 230 comprising ordinary circuits well-known in the art. By coupling DATA DRIVERs 205, 210, 220, and 230 to I/O CLK the outputs signals are generated with respect to the rising or falling edge of the external clocking signal I/O CLK. The DATA DRIVER circuits 205, 210, 220, and 230 are also coupled to PROCESSOR CLOCK and data inputs DATA 201, 202, 203, and 204. Using PROCESSOR CLOCK or I/O CLK, DATA DRIVERs 205,210,220, and 230 are able to latch corresponding data inputs DATA 201, 202, 203, and 204.

Figure 4:
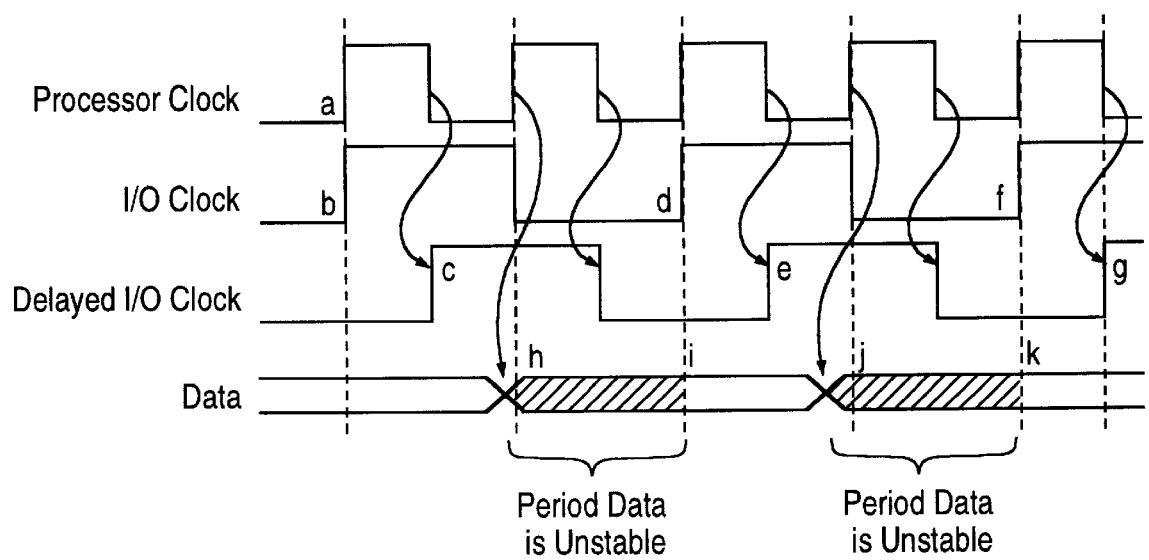
FIG. 4 is an illustration of timing diagram showing the relationship between the Processor Clock, the I/O clock, the delayed I/O clock, and the data output for one embodiment of the invention.

I/O CLOCK GENERATOR 240 is coupled to PROCESSOR CLOCK and I/O CLK and is used by DATA BLOCK 200 to generate output DELAY I/O CLK. Typically PROCESSOR CLOCK is operating at a higher frequency than I/O CLK, thus I/O CLOCK GENERATOR 240 is able to use a multiple phase delay of PROCESSOR CLOCK to delay I/O CLK. As illustrated in FIG. 4 DELAYED I/O CLOCK has a rising edge at point C that is delayed from point B of I/O CLOCK by one phase of PROCESSOR CLOCK. A similar delay is seen between the transition edges at point D and point E on FIG. 4. Adding this phase delay of PROCESSOR CLOCK to I/O CLOCK ensures a delay at the receiving components latching circuitry, so that most of the signal noise found on data OUTPUTS 211, 212, 213, and 214 has stabilized before the data is latched.

FIG. 3 shows CPU 300 for use in a source synchronous design according to one embodiment. Input CLKIN is a system clock that is used by PLL 330 to generate clock signal I/O CLOCK. I/O CLOCK is coupled to the array of DATA BLOCKs 331–361 and is used by the DATA BLOCKs to synchronize the driving of data outputs XDBUS 0 through XDBUS 63. The DATA BLOCKs also generate outputs DELAY I/O CLOCK 1 through DELAY I/O CLOCK 16. Each DELAY I/O CLOCK signal is associated with a group of data outputs. For example DELAY I/O CLOCK 1 is generated from the same DATA BLOCK 331 that generates data outputs XDBUS 0, 1, 2, and 3. Thus, the external receiving component (not shown) that latches outputs XDBUS 0, 1, 2, and 3 would utilize DELAY I/O CLOCK 1 as synchronizing signal to latch outputs XDBUS 0, 1, 2, and 3. I/O CLOCK is also coupled to INPUT BLOCK 380 and CACHE UNIT 320. INPUT BLOCK 380 passes signals from external inputs INPUTBUS 1 to CACHE UNIT 320 through INPUTBUS 2. CACHE UNIT 320 can process the signals from INPUTBUS 2 or pass the data to CORE UNITS 316 along BUS 1.

PLL 330 also generates PROCESSOR CLK. PROCESSOR CLK is coupled to CORE UNITS 310, CACHE UNIT 320, and DATA BLOCKs 331–361. CORE UNITS 310 use PROCESSOR CLK to synchronize signal transfers internally and along BUS 1 to CACHE UNIT 320. Data transferred along BUS 1 to CACHE UNIT 320 can be passed to DATA BLOCKs 331–361 through data lines DATA 0 through DATA 63 directly. This indirect data transfer between CORE UNITS 310 and DATA BLOCKs 331–361 allows CPU 300 to operate PROCESSOR CLK at a different frequency than I/O CLOCK because CORE UNITS 310 and CACHE UNIT 320 do not have to generate output signals XDBUS 0–63 directly. The difference in operating frequencies is utilized by CPU 300 to add a PROCESSOR CLK phase delay to I/O CLOCK and generate DELAY I/O CLOCK 1–16.

Thus, the claimed circuit allows the use of a source synchronous design wherein an input/output clock that is delayed by a phase of the internal clock is generated. The delayed input/output clock ensures that the data noise found during the switching of multiple outputs is not latched by a receiving component that uses the delayed input/output clock as a clocking signal.

What is claimed is:

1. An integrated circuit comprising:
   a clock generator for generating a core clock signal and an input/output (I/O) clock signal;
   a plurality of functional units, said plurality of functional units including a cache coupled to a core unit and an I/O unit coupled to said cache;
   a plurality of data blocks coupled to said core clock signal and said I/O clock signal, each of said data blocks comprising:

a plurality of data bus drivers, wherein each of said data bus drivers includes a first input coupled to said cache and a first output, said data bus drivers for receiving data from said cache unit and outputting said data, wherein said output of said data is external to said integrated circuit via the first output;

a delayed I/O clock generator coupled to said core clock signal and said I/O clock signal, said delayed I/O clock generator adding a phase multiple of said core clock signal to said I/O clock signal in order to generate a delayed I/O clock signal via a first external clock output.

2. The integrated circuit of claim 1 wherein said data being outputted external to said integrated circuit via said first output is synchronized with said delayed I/O clock signal.

3. A source synchronous computer system for reducing wait states and delays between components of said source synchronous computer system, which comprises:

a first component coupled to a second component, wherein said first component generates external data output signals that are synchronously captured by said second component, said first component comprising:

a system clock input;

a first circuit coupled to said system clock input, wherein said first circuit generates a first clock signal and a second clock signal, said first clock signal for synchronizing an external data output transmission and said second clock signal for synchronizing internal data signal transmissions;

a second circuit coupled to said first clock signal, said second clock signal, a plurality of m data driver circuits, and a plurality of input nodes wherein said second circuit receives external data signals via said input nodes and generates a plurality of internal data signals;

said plurality of m data driver circuits, wherein each of said m data driver circuits generates one of said plurality of said external data output signals of said first component synchronized to said first clock signal, wherein each of said m data driver circuits is coupled to one of said internal data signals via a first input and a data output node for outputting said one of said external data output signals, and wherein said plurality of m data driver circuits are divided into m/n data driver circuit sets, wherein n is the number of data driver circuits in each data driver circuit set;

a plurality of m/n delay clock circuits, wherein each of said m/n delay clock circuits generates an external delayed clock signal, wherein each of said m/n delay clock circuits is coupled to said first clock signal, said second clock signal, a delay clock output node for transmitting one of said external delayed clock signals, and wherein each of said m/n delay clock circuits generates said external delayed clock signal by adding a phase multiple of said second clock signal to said first clock signal;

an external output bus including said data output nodes of said plurality of m data driver circuits; and said second component comprising:

a plurality of m receiving circuits, wherein each of said m receiving circuits synchronously capture a signal from said external output bus, and wherein each of said receiving circuits is coupled to a node of said external output bus via a first input and to said external delayed clock signal of said first component via a second input.

4. The source synchronous computer system of claim 3 wherein said second clock signal operates at a higher frequency than said first clock signal.

5. A method for ensuring that clock signals change subsequent to data transitions during process variations in a source synchronous design, wherein clock signals are used to synchronize signal transmission between a plurality of components, said method comprising:

(a) generating a first clock signal and a second clock signal;

(b) transmitting an input data signal from a first component to a datablock component synchronous with said first clock signal via an input dataline;

(c) transmitting said first clock signal and said second clock signal to said datablock component;

(d) creating an output data signal;

(e) creating an output clock signal, wherein said output clock signal is created by adding a phase multiple of said second clock signal to said first clock signal;

(f) transmitting said output data signal from said datablock component to a second component;

(g) transmitting said output clock signal from said datablock component to said second component; and (h) synchronously capturing said output data signal in said second component with said transmitted output clock signal associated with said output data signal.

6. The method of claim 5 wherein said second clock signal operates at a higher frequency than said first clock signal.

7. An integrated circuit for use in a source synchronous design comprising:

a data driver, said data driver having an input data node and an output data node;

an I/O clock generator, said I/O clock generator having an I/O clock input node, a core clock input node, and a clock output node, wherein said I/O clock generator is coupled to said data driver:

said I/O clock generator generating an output clock signal at said clock output node, wherein said output clock signal is generated by adding a phase multiple of a core clock signal from said core clock input node to an I/O clock signal at said I/O clock input node, such that an output data signal from said output data node transitions prior to said output clock signal from said clock output node, and such that when said output data signal is captured by an external component synchronously using said output clock signal said output data signal has stabilized.

8. The integrated circuit of claim 7 wherein said core clock signal at said core clock input node is at a higher frequency than said I/O clock signal at said I/O clock input node.

9. An integrated circuit having a plurality of functional units and a clock generator for generating a core clock signal and an input/output (I/O) clock signal, said plurality of functional units including a cache, and I/O unit said I/O unit comprising:

a plurality of data blocks coupled to said core clock signal and said I/O clock signal, each of said data blocks comprising:

a plurality of data bus drivers for receiving data from said cache and outputting said data, wherein said output of said data is external to said integrated circuit, each of said data bus drivers including:

a first input coupled to said cache; a first output synchronized via said I/O clock signal; and a first drive circuit comprising a plurality of transistors for driving said first output;

a first clock generator coupled to said I/O clock signal and said core clock signal, wherein said first clock generator generates a first output clock signal by adding a phase multiple of said core clock signal to said I/O clock signal, said first clock generator including a second drive circuit for outputting said first output clock signal via a first external clock output.

10. The integrated circuit of claim 9 wherein said core clock signal operates at a higher frequency than said I/O clock signal.

* * * * *